(12) United States Patent
Sievers-Paulsen et al.

(10) Patent No.: US 10,491,977 B2
(45) Date of Patent: Nov. 26, 2019

(54) TOP CASE COMPRISING AN INTEGRATED LOUDSPEAKER ARRANGEMENT

(71) Applicant: Bayerische Motoren Werke Aktiengesellschaft, Munich (DE)

(72) Inventors: Johann Sievers-Paulsen, Freising (DE); Peter Reinhart, Peissenberg (DE); Andre Discher, Odelzhausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/125,889

(22) Filed: Sep. 10, 2018

(65) Prior Publication Data

US 2019/0007758 A1 Jan. 3, 2019

Related U.S. Application Data

(63) Continuation of application No. PCT/EP2017/050924, filed on Jan. 18, 2017.

(30) Foreign Application Priority Data

Mar. 11, 2016 (DE) .................. 10 2016 204 029

(51) Int. Cl.
*H04R 1/02* (2006.01)
*B62J 99/00* (2009.01)
*H04R 1/30* (2006.01)

(52) U.S. Cl.
CPC .............. *H04R 1/025* (2013.01); *B62J 99/00* (2013.01); *H04R 1/30* (2013.01); *B62J 2099/0006* (2013.01); *H04R 2499/13* (2013.01)

(58) Field of Classification Search
CPC . H04R 1/02; H04R 1/025; H04R 1/30; H04R 2499/13; B62J 99/00; B62J 2099/0006
(Continued)

(56) References Cited

U.S. PATENT DOCUMENTS 4,600,208 A 7/1986 Morishima
4,915,187 A 4/1990 Nakashima et al.
(Continued)

FOREIGN PATENT DOCUMENTS

CN 2412337 Y 12/2000
CN 201380910 Y 1/2010
(Continued)

OTHER PUBLICATIONS

International Search Report (PCT/ISA/210) issued in PCT Application No. PCT/EP2017/050924 dated Mar. 29, 2017 with English translation (six (6) pages).
(Continued)

*Primary Examiner* — Melur Ramakrishnaiah
(74) *Attorney, Agent, or Firm* — Crowell & Moring LLP

(57) ABSTRACT

A top case for a motor vehicle, in particular a motorcycle or a motorcycle-type motor vehicle, includes an integrated loudspeaker arrangement with a loudspeaker casing and at least one loudspeaker that is connected to the loudspeaker casing. The top case at least partially forms the loudspeaker casing. The loudspeaker casing includes a horn-shaped duct that is connected in an air-conducting manner to a rear side of the loudspeaker.

13 Claims, 3 Drawing Sheets

(58) Field of Classification Search
USPC .................. 381/86, 389; 280/288.4; 181/156
See application file for complete search history.

(56) References Cited

U.S. PATENT DOCUMENTS

| | | | |
|---|---|---|---|
| 6,298,943 B1 | 10/2001 | Yamada et al. | |
| 2005/0267674 A1* | 12/2005 | Suzuki | B62K 11/14 |
| | | | 701/444 |
| 2012/0025486 A1* | 2/2012 | Armitage | B60R 11/0217 |
| | | | 280/288.4 |

FOREIGN PATENT DOCUMENTS

| JP | 5-201287 A | | 8/1993 |
|---|---|---|---|
| JP | 2002-145154 A | | 5/2002 |
| JP | 2015-89098 A | | 5/2015 |
| JP | 2015089098 A | * | 5/2015 |

OTHER PUBLICATIONS

German-language Written Opinion (PCT/ISA/237) issued in PCT Application No. PCT/EP2017/050924 dated Mar. 29, 2017 (six (6) pages).

* cited by examiner

TOP CASE COMPRISING AN INTEGRATED LOUDSPEAKER ARRANGEMENT

CROSS REFERENCE TO RELATED APPLICATIONS

This application is a continuation of PCT International Application No. PCT/EP2017/050924, filed Jan. 18, 2017, which claims priority under 35 U.S.C. § 119 from German Patent Application No. 10 2016 204 029.4, filed Mar. 11, 2016, the entire disclosures of which are herein expressly incorporated by reference.

BACKGROUND AND SUMMARY OF THE INVENTION

The invention relates to a top case for a motor vehicle, in particular for a motorcycle or a motor vehicle similar to a motorcycle, having an integrated loudspeaker arrangement.

Motorcycles having loudspeaker systems are known, for example, from U.S. Pat. No. 4,915,187 B. An arrangement of loudspeakers which are integrated in lateral armrests for a passenger, the so-called pillion rider, is illustrated. The loudspeakers, conjointly with the armrests, are fastened to a luggage container, a so-called "top case", that is fitted to the motorcycle.

A similar arrangement is likewise described in U.S. Pat. No. 4,600,208 B.

The known arrangements usually have at least two loudspeakers which are provided in pairs and are disposed in a mirror-symmetrical manner on both sides of the vehicle. In order for a corresponding acoustic irradiation of the driver or of the pillion rider to be provided, amplifiers having a corresponding output and a corresponding wiring are required, which typically have to be attached in the spatial proximity of the loudspeakers and thus above a center of gravity of the vehicle.

Accordingly, a high total weight of the loudspeaker system is particularly disadvantageous since said loudspeaker system by virtue of the unfavorable position above the center of gravity has a direct and negative effect on the handling performance of the vehicle. Moreover, arrangements of this type cause a correspondingly high complexity in terms of materials and fitting, and associated high costs.

In view of the prior art, it is the object of the invention to reduce the mentioned disadvantages as far as possible, and to provide a compact and lightweight loudspeaker arrangement for a motorcycle or a motor vehicle similar to a motorcycle.

This and other objects are achieved by a so-called "top case" for a motor vehicle, in particular a motorcycle or a motor vehicle similar to a motorcycle, according to the invention, comprising an integrated loudspeaker arrangement having a loudspeaker housing and at least one loudspeaker. The top case at least in portions forms the loudspeaker housing. The loudspeaker housing moreover has a horn-shaped duct that, in an air-conducting manner, is connected to a rear side of the loudspeaker.

A container which is provided for receiving baggage items and to this end is capable of being fitted to a motorcycle or to a vehicle similar to a motorcycle, in particular on a baggage carrier or another suitable receptacle, is usually referred to as a "top case". Accordingly, the top case is correspondingly to be differentiated from cases or bags which are fitted laterally to the vehicle.

Vehicles similar to a motorcycle are to be understood to be, for example but not exclusively, so-called scooters, i.e. scooters with two, three, or four wheels, and trikes and quads.

The loudspeaker arrangement is integrated in the top case in such a manner that the top case simultaneously forms the loudspeaker housing. When visualized in a simplified manner, walls of the top case simultaneously serve as walls of the loudspeaker housing and, depending on the chosen shaping, accordingly define one or a plurality of sound volumes. One or a plurality of loudspeakers can be fastened to or in the loudspeaker housing. For example, the loudspeaker housing comprises one or a plurality of loudspeaker receptacles for fastening the one or the plurality of loudspeakers.

Additionally provided is the horn-shaped duct which in an air-conducting manner is connected to the rear side of the at least one loudspeaker. To this end, for example, a receptacle space which is defined by the loudspeaker receptacle and in which at least one rear side of the loudspeaker engages, can be designed so as to be open in relation to the horn-shaped duct. In this way, a common continuous air column and thus the air conduction described, is provided for the optimal transmission of sound. The functional mode of a so-called "back loaded horn system" can be achieved with the aid of this arrangement and be integrated in the top case, on account of which an acoustic pressure and the efficiency of the at least one loudspeaker can be significantly enhanced.

Conversely, this results in that the number of loudspeakers can be reduced in a corresponding manner as compared to known systems, in order for a comparable acoustic irradiation of a vehicle user, for example of the driver or the pillion rider, to be nevertheless achieved.

Depending on the embodiment of the loudspeaker arrangement, a single loudspeaker can already be sufficient. Accordingly, a second, additional loudspeaker can be dispensed with, and an associated amplifier support can be reduced, on account of which a corresponding weight and fitting effort are omitted. By virtue of the arrangement of the top case in a region above the center of gravity of the vehicle, a mass of the loudspeaker arrangement that is reduced on account thereof has a direct and positive effect on the handling performance of the vehicle.

For example, the horn-shaped duct can comprise at least one tubular portion and one horn portion that is widened to an exit opening of the horn-shaped duct. An entry of the tubular portion preferably faces the rear side of the loudspeaker, or the receptacle space of the associated loudspeaker receptacle, respectively, and is connected to the latter in an air-conducting manner so as to provide a continuous air column for the transmission of sound, as described. An acoustic pressure of the reflected sound emitted on the rear side of the loudspeaker can thus be transmitted to an air column present in the tubular portion. The tubular portion in the further course thereof opens into the horn portion which along the course of the latter toward the exit opening at the remote end of the horn portion widens and, in a manner analogous to musical instruments, can also be referred to as the "cup portion". This means that the horn portion along the extent thereof has a widening of the cross section such that at a first end of the horn portion that faces the tubular portion, a cross-section is provided that is smaller than an exit cross section at a second (open) end which is opposite the first end and at which the exit opening is provided.

Furthermore, at least the tubular portion of the horn-shaped duct can be aligned so as to be substantially parallel with a front side of the top case. In the installed state of the top case on the vehicle, the horn-shaped duct is thus aligned so as to be transverse to the envisaged vehicle longitudinal direction of the motor vehicle.

Additionally, it is possible that the at least one loudspeaker is disposed in the region of a first side of the top case, and an exit opening of the horn-shaped duct is disposed in the region of a second side of the top case and is disposed so as to be opposite the first side. Accordingly, the loudspeaker/loudspeakers as sound source(s) is/are ready on the first side of the top case in order to acoustically irradiate the driver or the pillion rider, for example. With the aid of the horn-shaped duct, the reflected sound of the loudspeaker is additionally utilized and is diverted by way of the horn-shaped duct to the second side of the top case. The diverted reflected sound there exits the exit opening so as to acoustically irradiate the driver or pillion rider also from that side.

Not only the left and the right lateral surfaces of the top case are to be understood as regions of the first and the second side of the top case. Rather, a left and right lateral region of the front side, for example to the left and/or to the right of a backrest of the pillion rider, are also to be understood as to be part of the lateral regions. The lateral regions explicitly include potential lateral cushions provided for laterally supporting the pillion rider, the at least one loudspeaker, on the one hand, and the exit opening, on the other side, potentially being disposed in said lateral cushions.

In any case, the horn-shaped duct enables the loudspeaker to be provided only on one side and to nevertheless achieve an acoustic irradiation on both sides. A dedicated (additional) loudspeaker on the second side and likewise an associated amplifier and the respective wiring can thus be dispensed with.

It is understood that, instead of the one loudspeaker described on the first side, a plurality of loudspeakers can also be provided on this first side and be collectively connected to the horn-shaped duct.

Likewise, the top case can have more than one of the described combinations composed of one or a plurality of loudspeakers and an associated horn-shaped duct. At least one or a plurality of the horn-shaped ducts herein is/are embodied according to this description.

According to a further embodiment, the loudspeaker housing can comprise a pressure chamber. The latter is defined by a volume which is likewise formed by the loudspeaker housing and is open at least in relation to the loudspeaker, in particular in relation to the rear side of the loudspeaker. This means, that the pressure chamber is also embodied so as to be open in relation to the receptacle chamber of the loudspeaker receptacle. The pressure chamber is preferably disposed so as to be parallel with the horn-shaped duct and is separated from the latter by a separation wall. An arrangement of this type can be established and be integrated in the top case in a particularly simple and space-saving manner.

According to a further embodiment, the loudspeaker housing at least in portions can be formed by an inner shell and by an outer shell that is connected to the inner shell, in particular an inner shell and/or an outer shell that are/is produced by means of injection molding. This means that at least the two shells, the inner shell and the outer shell, collectively form the loudspeaker housing or at least a portion of the loudspeaker housing. To this end, the two shells are joined together so as to collectively form a sound volume of the loudspeaker housing. Only optionally, the two shells can be sealed in relation to one another so as to prevent an undesirable exit of air between the two shells, for example by way of rubber seals that are disposed in a corresponding manner. A production of the inner shell and/or the outer shell can be performed by means of injection molding such that shaping is particularly simple and a weight of the respective shell is as low as possible.

Furthermore, the inner shell can be configured so as to be integral to a lid element or a base element of the top case. This means that the inner shell is produced integrally and in a materially integral manner with the lid element, or alternatively with the base element. This is achieved, for example, by producing an injection-molded part by means of injection molding. A high degree of integration can be achieved in this way, and double walls as would be the case with a simple fastening of the inner shell to a separately produced lid element or base element can be dispensed with. However, the latter fastening variant is possible, in principle, and can be achieved by means of a material integral and/or force-fitting and/or form-fitting connection of the inner shell to the lid element or the base element.

In any case, the entire loudspeaker housing can be connected either to the lid element or the base element of the top case, and collectively be part of a "lid arrangement" or a "base arrangement", respectively.

For example, a shell-shaped lid of the top case is to be understood as the lid element, said shell-shaped lid being configured conjointly with the base element, for example a shell-shaped base tub, so as to be rotatable indirectly or directly by way of a hinge, collectively enclosing an interior space of the top case for receiving baggage.

It is understood that the base element and/or that the lid element can in each case be embodied with multiple walls, for example having an inner wall and an outer wall surrounding the inner wall. Accordingly, the inner shell of the loudspeaker housing can be configured so as to be integral to only one of the plurality of walls, thus for example integral to only the respective inner wall or outer wall, or both walls.

Furthermore, the outer shell can comprise at least one integrated hinge part which is configured for connecting in a rotatable manner to a hinge counterpart of the base element or the lid element of the top case. This means that the outer shell of the loudspeaker housing that is assigned either to the lid arrangement or the base arrangement can comprise one or a plurality of hinge parts by means of which the outer shell is connected in a rotatable manner to the respective opposite element of the top case, that is to say either to the base element or the lid element, conjointly with a hinge counterpart disposed there to this end forming a common hinge. A degree of integration which enables a particularly simple and compact construction of the top case is enhanced in this way.

According to one preferred embodiment, the at least one loudspeaker is a low-range loudspeaker, in particular a low-range loudspeaker having a frequency range $f \leq 400$ Hz, preferably $f \leq 150$ Hz. Sound having low frequencies of this type can be conducted in a particularly advantageous manner by means of the horn-shaped duct.

It is understood that in addition to the at least one loudspeaker, further auxiliary loudspeakers, in particular mid-range loudspeakers or high-range loudspeakers, can be provided in or on the top case, said auxiliary loudspeakers however not being connected to the horn-shaped duct. For example, these auxiliary loudspeakers are provided in pairs and in each case disposed in a mirror-symmetrical manner in the region of the first side and in the region of the second side of the top case.

Furthermore, the top case can comprise a backrest arrangement for the vehicle user, wherein the backrest arrangement covers the outer shell at least in portions or completely. This means that the top case represents an integral unit of a baggage space, a loudspeaker arrangement, and a backrest arrangement and thus can be configured in a particularly simple and compact manner.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
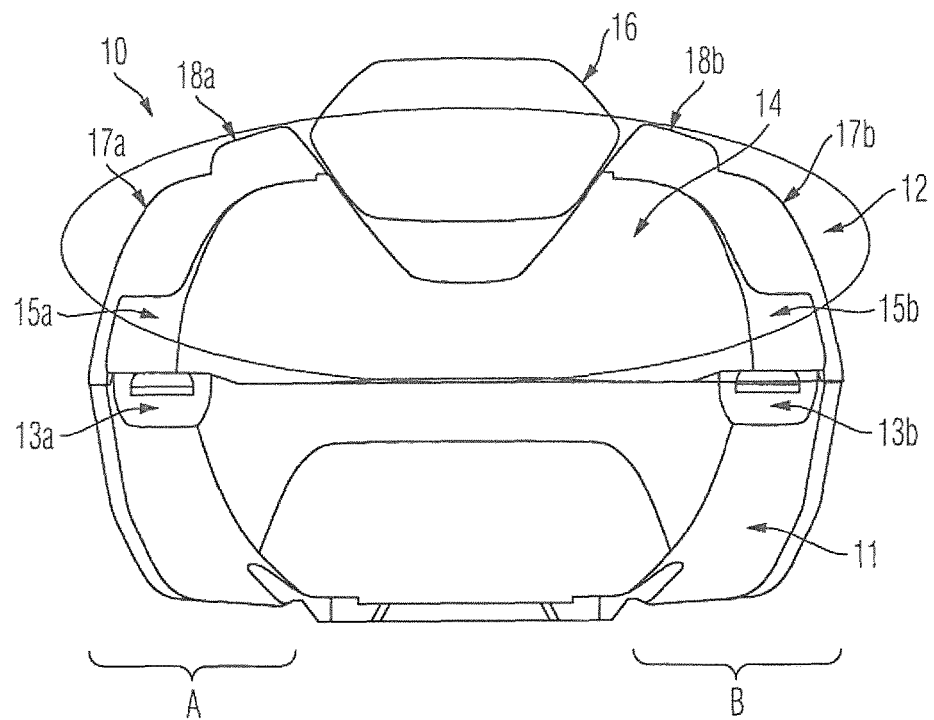
FIG. 1 shows a front side of a top case according to the description, in a front view.

A front side of a so-called "top case" 10 is illustrated in a frontal view in FIG. 1. The top case is a baggage container that is fastenable to a motorcycle (or to a motor vehicle similar to a motorcycle), which typically comprises a base arrangement that receives the baggage, presently formed by a shell-shaped base element 11, and a lid arrangement 12 that covers the baggage. By means of hinges 13a, 13b on the base element 11, the lid arrangement 12 is rotatably connected for opening and closing the top case 10. The lid arrangement 12 and the shell-shaped base element 11 in the closed state of the top case 10 define a receptacle volume for the baggage.

The illustrated front side of the top case 10 in the installed state of the top case 10 usually points in the driving direction, or in the vehicle longitudinal direction of the vehicle, respectively, and is thus disposed directly behind a pillion rider. The front side of the lid arrangement 12 additionally comprises an ergonomically molded backrest arrangement which has a backrest 14 and two lateral cushions 15a, 15b for supporting the pillion rider, and optionally an additional pad 16.

In each case one opening 17a, 17b for the exit of sound from a loudspeaker arrangement 20 (cf. FIGS. 2 to 5) that is integrated behind the backrest 14 in the lid arrangement 12 of the top case 10 is provided in the two lateral cushions 15a, 15b.

Additionally, and likewise optionally, in each case at least one auxiliary loudspeaker 18a, 18b, embodied as a high-range and/or mid-range loudspeaker, can be disposed on both sides of the pad 16 in the region of an upper side of the lid arrangement 12. However, said auxiliary loudspeakers 18a, 18b are preferably not part of the loudspeaker arrangement 20 described, or of the loudspeaker housing 21, respectively.

Figure 2:
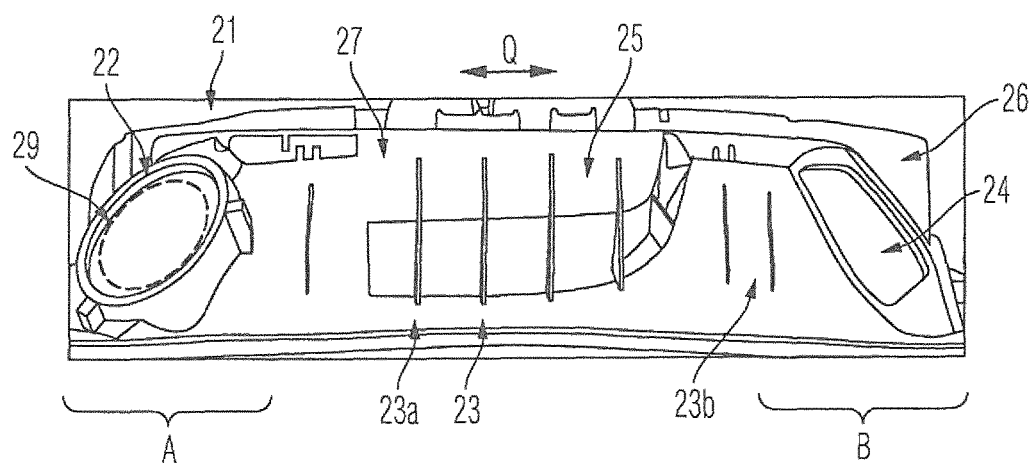
FIG. 2 shows a loudspeaker housing that is connected to a lid element of the top case.

FIG. 2, in a detailed view of FIG. 1, shows the loudspeaker arrangement 20 that is integrated in the lid arrangement 12 of the top case 10. The loudspeaker arrangement 20 is visible as soon as the backrest arrangement 14, shown in FIG. 1, is removed from the loudspeaker arrangement 20.

For the sake of clarity, only the loudspeaker housing 21 of the loudspeaker arrangement 20 is illustrated. The position of a loudspeaker 29 that is connectable to the loudspeaker housing 21 is indicated in only a schematic manner and is identified by a loudspeaker receptacle 22 that is provided to this end. The loudspeaker 29 can be inserted into the loudspeaker receptacle 22, wherein a loudspeaker front side is aligned so as to point out of the image plane.

The loudspeaker housing 21 comprises a horn-shaped duct 23 that in an air-conducting manner is connected to a rear side of the loudspeaker 29. Said horn-shaped duct 23 has a tubular portion 23a and a horn portion 23b that is widened to an exit opening 24. At least the tubular portion 23a of the horn-shaped duct 23 is aligned so as to be transverse (transverse direction Q) to the envisaged vehicle longitudinal direction of the motor vehicle. This means that at least the tubular portion 23a runs so as to be substantially parallel with the front side of the top case 10. The horn portion 23b is also aligned so as to be substantially in this transverse direction Q and additionally so as to be tilted in the longitudinal direction of the vehicle.

This arrangement enables that the loudspeaker 29 is disposed in the region of a first side A of the top case 10, more specifically of the lid arrangement 12, and the exit opening 24 of the horn-shaped duct 23 is disposed in the region of a second side B of the top case 10, or of the lid arrangement 12, respectively, that is disposed so as to be opposite the first side A. As is illustrated in FIG. 2, the loudspeaker receptacle 22, and thus also a loudspeaker front side of the loudspeaker to be inserted herein, are disposed laterally and so as to be tilted upward in the direction of the front side of the top case, such that sound can be emitted by means of the loudspeaker 29 on the loudspeaker front side thereof in the region of the first side A. A reflected sound emitted on the rear side of said loudspeaker 29 is transmitted in the direction of the exit opening 24 by way of an air column provided in the horn-shaped duct 23, said reflected sound exiting said exit opening 24 (cf. profile marked by arrow in FIG. 3). Despite the one-sided positioning of the loudspeaker 29, a sound experience can be produced in this way on both sides for the pillion rider without having to provide a respective loudspeaker on both sides. A second loudspeaker and a usually required additional amplifier can be dispensed with.

The loudspeaker housing 21 additionally comprises a pressure chamber 25. The latter adjoins the rear side of the loudspeaker 29 in an air-conducting manner, and extends so as to be parallel with the tubular portion 23a of the horn-shaped duct 23.

As can be seen from FIG. 2, the loudspeaker housing 21 is formed, on the one hand, by an inner shell 26 which in the embodiment illustrated is configured so as to be integral to a lid element 12a of the lid arrangement 12. On the other hand, the loudspeaker housing 21 is also formed by an outer shell 27 that is connected to the inner shell 26. The outer shell 27 in the region of the front side of the top case 10, or of the entire lid arrangement 12, respectively, is placed onto the inner shell 26 so as to conjointly define the loudspeaker housing 21.

This arrangement is also suitable for complicated geometries and can be produced in a particularly simple manner, for example by means of injection molding the inner shell 26 and/or the outer shell 27.

Figure 3:
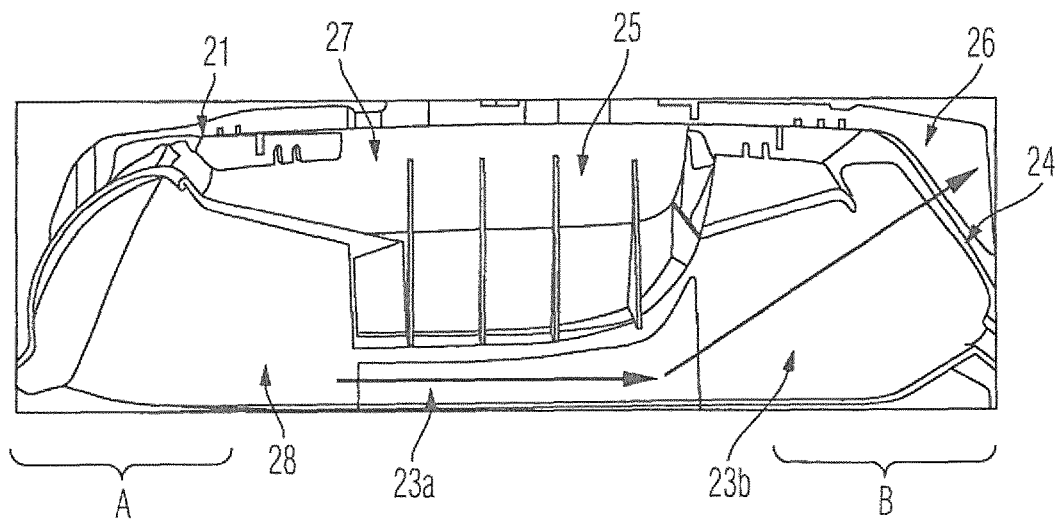
FIG. 3 shows a frontal sectional view of the integrated loudspeaker housing.

FIG. 3 shows a frontal sectional view of the integrated loudspeaker housing 21, wherein the section plane lies so as to be parallel with the viewing plane from FIG. 2. To be seen are the loudspeaker receptacle 22 for the loudspeaker that is indicated only in a schematic manner, and the tubular portion 23b of the horn-shaped duct 23, and the horn portion 23b that in the course thereof in the direction of the exit opening 24, in terms of the cross-section of said horn portion 23b, is widened. Likewise to be seen is the receptacle space 28 assigned to the loudspeaker receptacle 22, a rear side of the loudspeaker 29 received in the loudspeaker receptacle 22 protruding into said receptacle space 28. The receptacle space 28 in an air-conducting manner is connected to the tubular portion 23a and to the pressure chamber 25. To this end, the receptacle space 28 is open in relation to the pressure chamber 25 and to the tubular portion 23a.

Figure 4:
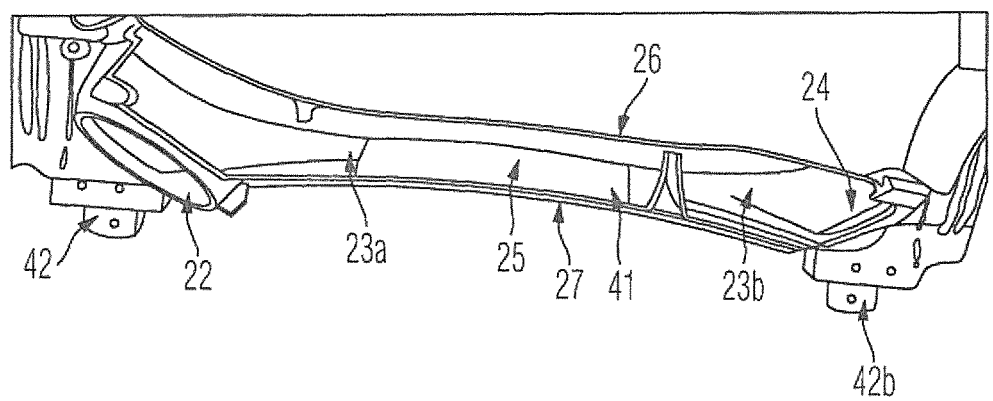
FIG. 4 shows a sectional plan view of the lid element and of the integrated loudspeaker housing.

FIG. 4 shows a horizontally sectioned plan view of the integrated loudspeaker housing 21 with a view into the pressure chamber 25. Likewise to be seen are the loudspeaker receptacle 22, the receptacle space 28, the tubular portion 23b connected to the latter (only the entry of said tubular portion 23b being visible), and the exit opening 24 at the end of the widened horn portion 23b. FIG. 4 additionally shows part of the pressure chamber 25 which in an air-conducting manner is connected to the receptacle space 28 and which by way of a separation wall 41 is separated from the tubular portion 23a.

Figure 5:
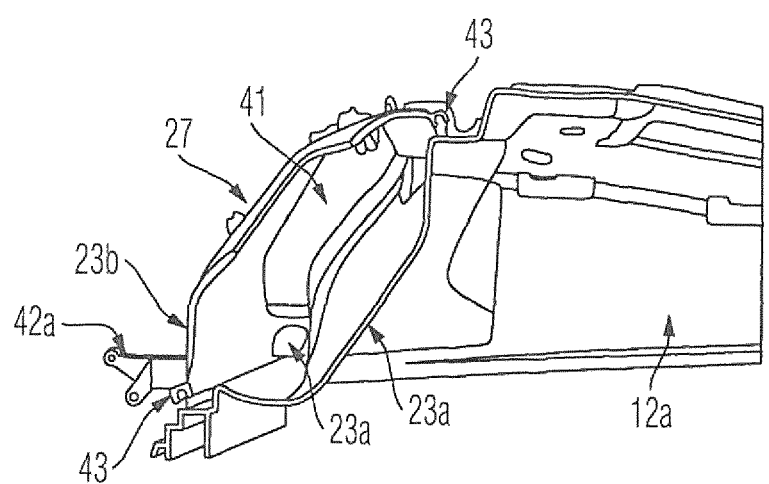
FIG. 5 shows a sectional side view of the lid element and of the integrated loudspeaker housing.

A sectional side view of the integrated loudspeaker housing 21 with the view into the horn portion 23b is illustrated in FIG. 5. To be seen are the widened cross-section of the horn portion 23b and the tubular portion 23a connected to the latter. The separation wall 41 for delimiting the pressure chamber 25 from the tubular portion 23a is additionally illustrated.

As can be seen from FIG. 4 and FIG. 5, the loudspeaker housing 21 is defined substantially by the inner shell 26 and by the outer shell 27 that is connected to the inner shell 26. Both shells 26, 27, by way of their respective contour, conjointly form the cavity of the loudspeaker housing 21.

The inner shell 26 in the embodiment illustrated is configured integrally with the lid element 12a so as to form an integral component which is a substantial component part of the lid arrangement 12. The lid arrangement 12 additionally comprises at least the outer shell 27, connected to said lid arrangement 12, and the backrest arrangement 14 illustrated only in FIG. 1.

By virtue of this integral design embodiment of the inner shell of the loudspeaker housing and of the lid element 12a, a first surface of the integral component thus delimits the cavity of the loudspeaker housing, on the one hand, and an opposite second surface delimits an interior space of the top case.

This means that, proceeding from the integral component composed of the lid element 12a and of the inner shell 26 integrally connected thereto, a loudspeaker housing can be formed in a particularly advantageous manner and thus be integrated in the top case by locally placing the outer shell 27 in a region that faces the pillion rider. As described, the outer shell 27 can be additionally covered by the backrest 14.

In order for an optimal functional mode of the loudspeaker housing 21 to be achieved, the outer shell 27 and the inner shell 26 are connected to one another in an air-tight manner via one or a plurality of seals 43, in particular an encircling seal.

For an additional integration of functions and a reduction in the number of components to be installed, the outer shell 27 optionally comprises two hinge parts 42a, 42b for rotatably connecting to associated hinge counterparts which are provided, for example, in the base arrangement (here on the base element 11) of the top case 10, conjointly forming the respective hinges 13a, 13b.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A top case for a motor vehicle, comprising:
    an integrated loudspeaker arrangement having a loudspeaker housing and at least one loudspeaker that is connected to the loudspeaker housing, wherein
        the top case at least in portions forms the loudspeaker housing, and
        the loudspeaker housing has a horn-shaped duct separate from a luggage-receiving portion of the top case that, in an air-conducting manner, is connected to a rear side of the loudspeaker.

2. The top case as claimed in claim 1, wherein
the horn-shaped duct comprises at least one tubular portion and one horn portion that is widened to an exit opening of the horn-shaped duct.

3. The top case as claimed in claim 2, wherein
at least the tubular portion of the horn-shaped duct is aligned so as to be substantially parallel with a front side of the top case.

4. The top case as claimed in claim 2, wherein
the loudspeaker is disposed in a region of a first side of the top case, and
the exit opening of the horn-shaped duct is disposed in a region of a second side of the top case that is disposed so as to be opposite the first side.

5. The top case as claimed in claim 1, wherein
the loudspeaker housing comprises one pressure chamber.

6. The top case as claimed in claim 1, wherein
the loudspeaker housing at least in portions is formed by an inner shell and by an outer shell that is connected to the inner shell.

7. The top case as claimed in claim 6, wherein
the inner shell is integrally connected to a lid element or a base element of the top case.

8. The top case as claimed in claim 6, wherein
the outer shell comprises at least one integrated hinge part which is configured for connecting in a rotatable manner to a hinge counterpart of a base element or a lid element of the top case.

9. The top case as claimed in claim 6, further comprising:
a backrest arrangement for a vehicle user, wherein
    the backrest arrangement covers the outer shell at least in portions or completely.

10. The top case as claimed in claim 6, wherein
one or both of the inner shell and the outer shell are injection molded shells.

11. The top case as claimed in claim 1, wherein
the loudspeaker is a low-range loudspeaker.

12. The top case as claimed in claim 11, wherein
the low-range loudspeaker has a frequency range f≤400 Hz.

13. The top case as claimed in claim 1, wherein
the motor vehicle is a motorcycle or a motor vehicle similar to a motorcycle.

* * * * *